(12) United States Patent
Chen et al.

(10) Patent No.: US 12,527,197 B2
(45) Date of Patent: Jan. 13, 2026

(54) OLED DISPLAY PANEL

(71) Applicants: Wuhan China Star Optoelectronics Technology Co., Ltd., Hubei (CN); Wuhan china Star Optoelectronics Semiconductor Display Technology Co., Ltd., Hubei (CN)

(72) Inventors: Jianfeng Chen, Hubei (CN); Shuyuan Zhang, Hubei (CN)

(73) Assignees: Wuhan China Star Optoelectronics Technology Co., Ltd., Wuhan (CN); Wuhan china Star Optoelectronics Semiconductor Display Technology Co., Ltd., Wuhan (CN)

( * ) Notice: Subject to any disclaimer, the term of this patent is extended or adjusted under 35 U.S.C. 154(b) by 585 days.

(21) Appl. No.: 17/431,444

(22) PCT Filed: Jun. 10, 2021

(86) PCT No.: PCT/CN2021/099295
§ 371 (c)(1),
(2) Date: Aug. 17, 2021

(87) PCT Pub. No.: WO2022/246920
PCT Pub. Date: Dec. 1, 2022

(65) Prior Publication Data
US 2024/0023405 A1    Jan. 18, 2024

(30) Foreign Application Priority Data

May 28, 2021   (CN) .......................... 202110588836.8

(51) Int. Cl.
*H10K 59/40*    (2023.01)
*G06F 3/041*    (2006.01)
*G06F 3/044*    (2006.01)

(52) U.S. Cl.
CPC ........... *H10K 59/40* (2023.02); *G06F 3/0412* (2013.01); *G06F 3/0443* (2019.05); *G06F 3/0445* (2019.05); *G06F 2203/04112* (2013.01)

(58) Field of Classification Search
CPC ..... H10K 59/40; G06F 3/0412; G06F 3/0443; G06F 3/0445; G06F 2203/04112
See application file for complete search history.

(56) References Cited

U.S. PATENT DOCUMENTS 11,402,954 B2 *  8/2022  Li ........................ H10K 59/40
11,721,122 B2 *  8/2023  Xu ..................... G06V 40/1318
                                                      345/156

(Continued)

FOREIGN PATENT DOCUMENTS

CN        107025010        8/2017
CN        107046051        8/2017

(Continued)

*Primary Examiner* — Jay C Kim
*Assistant Examiner* — Woo K Lee

(57) ABSTRACT

The present application provides an OLED display panel, which includes: a substrate layer, an array layer, a light-emitting functional layer, an encapsulation layer, a touch layer, a filter layer, and a protective layer, wherein the filter layer includes a black matrix layer and a color filter layer. There is no adhesive layer between the touch layer and the filter layer and between the filter layer and the protective layer. The OLED display panel according to the present application can realize lightness and thinness of the display panel and increase light extraction rate.

12 Claims, 5 Drawing Sheets

(56) References Cited

U.S. PATENT DOCUMENTS

| | | | | |
|---|---|---|---|---|
| 2012/0019740 A1* | 1/2012 | Kadowaki | ............... | G02B 5/201 |
| | | | | 349/61 |
| 2015/0160767 A1* | 6/2015 | Song | ..................... | G06F 3/0412 |
| | | | | 345/174 |
| 2019/0079607 A1* | 3/2019 | Tai | .................... | G02F 1/133512 |

FOREIGN PATENT DOCUMENTS

| | | | | |
|---|---|---|---|---|
| CN | 107919380 | | 4/2018 | |
| CN | 108242455 | | 7/2018 | |
| CN | 109119453 | | 1/2019 | |
| CN | 109343743 | | 2/2019 | |
| CN | 110096177 | | 8/2019 | |
| CN | 110323355 | | 10/2019 | |
| CN | 110323355 A * | | 10/2019 | ............. G06F 3/041 |
| CN | 110534551 | | 12/2019 | |
| CN | 111599846 | | 8/2020 | |
| CN | 111883576 | | 11/2020 | |
| CN | 111933673 | | 11/2020 | |
| CN | 112002736 | | 11/2020 | |
| CN | 112861651 A * | | 5/2021 | ......... G06V 40/1318 |

\* cited by examiner

OLED DISPLAY PANEL

RELATED APPLICATIONS

This application is a National Phase of PCT Patent Application No. PCT/CN2021/099295 having International filing date of Jun. 10, 2021, which claims the benefit of priority of Chinese Patent Application No. 202110588836.8 filed on May 28, 2021. The contents of the above applications are all incorporated by reference as if fully set forth herein in their entirety.

FIELD AND BACKGROUND OF THE INVENTION

The present disclosure relates to the field of display technology, in particular to an organic light-emitting diode (OLED) display panel.

An OLED display panel is a self-luminous display device that uses an organic thin film as a light-emitting element. The OLED display panel has many advantages such as self-luminescence, low driving voltage, high luminous efficiency, short response time, high definition and contrast, nearly 180° viewing angle, wide operating temperature range, flexible display, and large area full color display, etc. The OLED display panel is recognized by the industry as a most promising display device.

The OLED display panel usually comprises: a substrate, an anode disposed on the substrate, a hole injection layer disposed on the anode, a hole transport layer disposed on the hole injection layer, a light-emitting functional layer disposed on the hole transport layer, an electron transport layer disposed on the light-emitting functional layer, an electron injection layer disposed on the electron transport layer, and a cathode disposed on the electron injection layer. A principle of light emission is that semiconductor materials and organic light-emitting materials are driven by an electric field to cause light emission through carrier injection and recombination.

However, in addition to the substrate, an existing OLED display panel also comprises components such as a polarizer and a protective substrate, and adhesive layers for connection are disposed between the components. Therefore, the OLED display panel still has a problem of large overall thickness, and improving light extraction rate of the OLED display panel has been a constant pursuit of developers.

SUMMARY OF THE INVENTION

The purpose of the present disclosure is to provide an OLED display panel to solve problems in the prior art, which can effectively reduce a thickness of the OLED display panel and increase a light extraction rate.

The purpose of the present disclosure is to provide an OLED display panel to solve problems in the prior art, which can effectively reduce a thickness of the OLED display panel and increase a light extraction rate.

The present disclosure provides an OLED display panel, wherein the OLED display panel comprises:
  a substrate layer;
  an array layer formed on a side of the substrate layer;
    a light-emitting functional layer formed on a side of the array layer away from the substrate layer;
    an encapsulation layer formed on a side of the light-emitting functional layer away from the array layer; and
    a protective layer formed on a side of the encapsulation layer away from the light-emitting functional layer,
    wherein a touch layer and a filter layer are further disposed between the encapsulation layer and the protective layer, the filter layer comprises a black matrix layer and a color filter layer, and there is no adhesive layer between the encapsulation layer and the protective layer.

In some embodiments, wherein the substrate layer comprises:
  a first substrate layer; and
  a first barrier layer formed on a side of the first substrate layer close to the array layer, wherein the first substrate layer and the first barrier layer are
  formed by chemical vapor deposition.

In some embodiments, the substrate layer further comprises:
  a second substrate layer formed on a side of the first barrier layer away from the first substrate layer; and
  a second barrier layer formed on a side of the second substrate layer away from the first barrier layer,
  wherein the second substrate layer and the second barrier layer are formed by chemical vapor deposition.

In some embodiments, the touch layer comprises the following layers formed by deposition:
  a first touch insulating layer formed on a side of the encapsulation layer away from the light-emitting functional layer; and
  a first touch metal layer formed on a side of the first touch insulating layer away from the encapsulation layer, wherein the first touch metal layer has a metal mesh structure;
  a second touch insulating layer formed on a side of the first touch metal layer away from the first touch insulating layer, wherein a contact hole is formed at a position corresponding to the first touch metal layer; and
  a second touch metal layer formed on a side of the second touch insulating layer away from the first touch metal layer, wherein the second touch metal layer has a metal mesh structure and is filled in the contact hole to contact the first touch metal layer.

In some embodiments, the filter layer is disposed on a side of the touch layer away from the substrate layer, the black matrix layer is disposed corresponding to positions of the first touch metal layer and the second touch metal layer, a projection of the black matrix layer on a plane of the substrate layer and projections of the first touch metal layer and the second touch metal layer on the plane of the substrate layer are overlapped, and
  wherein a plurality of opening regions are disposed in the black matrix layer, and the color filter layer is filled in the opening regions to receive light excited from the light-emitting functional layer.

The filter layer is disposed on a side of the touch layer close to the substrate layer, the black matrix layer is disposed corresponding to positions of the first touch metal layer and the second touch metal layer, a projection of the black matrix layer on a plane of the substrate layer and projections of the first touch metal layer and the second touch metal layer on the plane of the substrate layer are overlapped, and
  wherein a plurality of opening regions are disposed in the black matrix layer, and the color filter layer is filled in the opening regions to receive light excited from the light-emitting functional layer.

In some embodiments, a cross section of any one of the opening regions has a shape with narrow top and wide bottom, and a reflective film is formed on side surfaces of each of the opening regions.

In some embodiments, the cross section of each of the opening regions is trapezoidal.

In some embodiments, a thickness of the reflective film is less than 130 nm.

The present disclosure further provides an OLED display panel, wherein the OLED display panel comprises:
- a substrate layer;
- an array layer formed on a side of the substrate layer;
- a light-emitting functional layer formed on a side of the array layer away from the substrate layer;
- an encapsulation layer formed on a side of the light-emitting functional layer away from the array layer; and
- a protective layer formed on a side of the encapsulation layer away from the light-emitting functional layer,
- wherein a touch layer and a filter layer are further disposed between the encapsulation layer and the protective layer, and the filter layer is disposed on a side of the touch layer close to the substrate,
- wherein the filter layer comprises a black matrix layer and a color filter layer, and
- wherein there is no adhesive layer between the encapsulation layer and the protective layer.

The OLED display panel according to the embodiment of the present disclosure replaces the backplane, the touch panel, the polarizer, the glass cover plate, and other structures of the OLED display panel in the prior art, and is provided with the substrate layer, the integrated touch layer, and the filter layer without polarizer by coating, deposition, etc. Compared with the prior art, the use of adhesive layers is reduced. Therefore, a thickness of the OLED display panel is greatly reduced and light transmittance is improved, which is beneficial to lightness and thinness of the OLED display panel and can improve display quality. In addition, according to the OLED display panel of the embodiment of the present disclosure, a lower surface of the black matrix layer is set to be small, so that a side surface has an acute angle with respect to a plane of the touch layer, so that divergent light can be reflected and converged and light extraction rate of the display panel is improved.

BRIEF DESCRIPTION OF THE SEVERAL VIEWS OF THE DRAWINGS

In order to more clearly explain the technical solutions in the embodiments of the present disclosure, the following will briefly introduce the drawings required in the description of the embodiments. Obviously, the drawings in the following description are only some embodiments of the present disclosure. For those skilled in the art, without paying any creative work, other drawings can be obtained based on these drawings.

DESCRIPTION OF SPECIFIC EMBODIMENTS OF THE INVENTION

Figure 1:
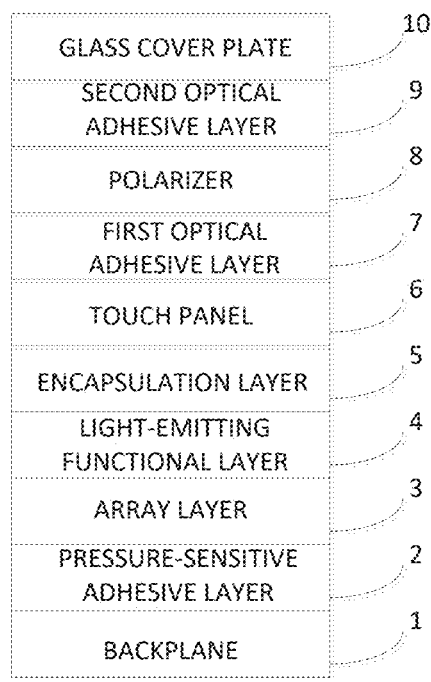
FIG. 1 shows a schematic diagram of an OLED display panel in the prior art.

Technical solutions in embodiments of the present disclosure will be clearly and completely described below in conjunction with drawings in the embodiments of the present disclosure. Obviously, the described embodiments are only a part of embodiments of the present disclosure, rather than all the embodiments. Based on the embodiments in the present disclosure, all other embodiments obtained by those skilled in the art without creative work fall within the protection scope of the present disclosure.

In the description of the present disclosure, it should be understood that orientations or position relationships indicated by the terms "center", "longitudinal", "lateral", "length", "width", "thickness", "upper", "lower", "front", "rear", "left", "right", "vertical", "horizontal", "top", "bottom", "inside", "outside", "clockwise", and "counter-clockwise" are based on orientations or position relationships illustrated in the drawings. The terms are used to facilitate and simplify the description of the present disclosure, rather than indicate or imply that the devices or elements referred to herein are required to have specific orientations or be constructed or operate in the specific orientations. Accordingly, the terms should not be construed as limiting the present disclosure. In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined.

In the description of the present disclosure, it should be noted that unless otherwise clearly defined and limited, the terms "mounted", "connected/coupled", and "connection" should be interpreted broadly. For example, the terms may refer to a fixed connection, a detachable connection, or an integral connection; the terms may also refer to a mechanical connection, an electrical connection, or communication with each other; the terms may further refer to a direct connection, an indirect connection through an intermediary, or an interconnection between two elements or interactive relationship between two elements. Those skilled in the art can understand the specific meanings of the above-mentioned terms in the present disclosure according to circumstances.

In the present disclosure, it should be noted that unless otherwise clearly defined and limited, a first feature "on" or "under" a second feature may mean that the first feature directly contacts the second feature, or that the first feature contacts the second feature via an additional feature there between instead of directly contacting the second feature. Moreover, the first feature "on", "above", and "over" the second feature may mean that the first feature is right over or obliquely upward over the second feature or mean that the first feature has a horizontal height higher than that of the second feature. The first feature "under", "below", and "beneath" the second feature may mean that the first feature is right beneath or obliquely downward beneath the second feature or mean that that horizontal height of the first feature is lower than that of the second feature.

The following description provides various embodiments or examples for implementing various structures of the present disclosure. To simplify the description of the present disclosure, parts and settings of specific examples are described as follows. Certainly, they are only illustrative, and are not intended to limit the present disclosure. Further, reference numerals and reference letters may be repeated in different examples. This repetition is for purposes of simplicity and clarity and does not indicate a relationship of the various embodiments and/or the settings. Furthermore, the present disclosure provides specific examples of various processes and materials, however, disclosures of other processes and/or other materials may be appreciated those skilled in the art.

FIG. 1 shows a schematic diagram of an OLED display panel in the prior art.

As shown in FIG. 1, an OLED display panel 100 in the prior art comprises a backplane 1, an array layer 3, a light-emitting functional layer 4, an encapsulation layer 5, a touch panel 6, a polarizer 8, and a glass cover plate 10 stacked in sequence. In addition, as shown in FIG. 1, the backplane 1 and the array layer 3 are connected by an adhesive layer 2, wherein the adhesive layer 2 may be a pressure-sensitive adhesive layer. The polarizer 8 is disposed between the touch panel 6 and the glass cover plate 10, and a first optical adhesive layer 7 and a second optical adhesive layer 9 are respectively disposed between the polarizer 8 and the touch panel 6 and the glass cover plate 10 to connect the polarizer 8 with the touch panel 6 and the glass cover plate 10.

In the OLED display panel 100 in the prior art, most components are independent sheets, and the components are connected to each other through additional adhesive layers. Therefore, the OLED display panel in the prior art has a problem of large thickness. Table 1 below shows exemplary thickness data of various components of the OLED display panel in the prior art. Based on data in Table 1, it can be seen that an overall thickness of the OLED display panel in the prior art can reach nearly 400 μm, and excessive thickness of the OLED display panel is not conducive to lightness and thinness of the display panel, and leads to deterioration of bendability of the display panel.

TABLE 1

Reference thickness of the OLED display panel in the prior art

| | |
|---|---|
| Glass cover plate | 80 μm |
| Second optical adhesive layer | 20 μm |
| Polarizer | 67 μm |
| First optical adhesive layer | 25 μm |
| Touch panel | 23 μm |
| Encapsulation layer | 15.2 μm |
| Light-emitting functional layer | 6 μm |
| Array layer | 28 μm |
| Pressure-sensitive adhesive layer | 25 μm |
| Backplane | 50 μm |

Figure 2:
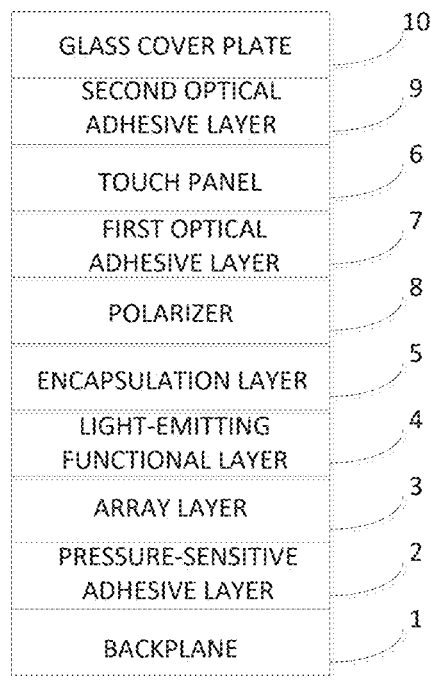
FIG. 2 shows a schematic diagram of another OLED display panel in the prior art.

FIG. 2 shows a schematic diagram of another OLED display panel in the prior art.

As shown in FIG. 2, compared with the OLED display panel 100 in the prior art shown in FIG. 1, in an OLED display panel 100' shown in FIG. 2, merely positions of the touch panel 6 and the polarizer 8 are exchanged. The touch panel 6 is disposed between the polarizer 8 and the glass cover plate 10, and the first optical adhesive layer 7 and the second optical adhesive layer 9 are respectively disposed between the touch panel 6 and the polarizer 8 and between the touch panel 6 and the glass cover plate 10, so as to connect the touch panel 6 with the polarizer 8 and the glass cover plate 10. An overall thickness of the OLED display panel shown in FIG. 2 can also reach nearly 400 μm. The excessive thickness of the OLED display panel is not conducive to the lightness and thinness of the display panel, and leads to deterioration of the bendability of the display panel.

Figure 3:
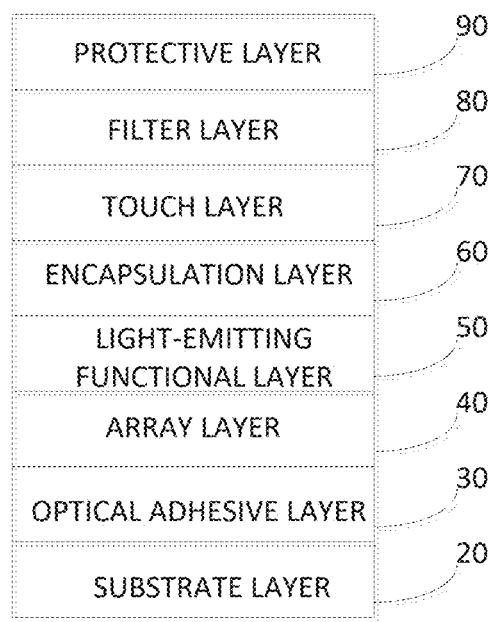
FIG. 3 shows a schematic diagram of an OLED display panel according to an embodiment of the present disclosure.

FIG. 3 shows a schematic diagram of an OLED display panel according to an embodiment of the present disclosure.

As shown in FIG. 3, similar to the OLED display panel 100 in the prior art shown in FIG. 1, an OLED display panel 200 according to an embodiment of the present disclosure also comprises an array layer 40, a light-emitting functional layer 50, and an encapsulation layer 60 stacked in sequence. In addition, the OLED display panel 200 further comprises a substrate layer 20 formed on a side of the array layer 40, and a touch layer 70, a filter layer 80, and a protective layer 90 sequentially stacked on the encapsulation layer 60, wherein there is no adhesive layer between the touch layer 70 and the filter layer 80, and between the filter layer 80 and the protective layer 90. Furthermore, there is no adhesive layer between the encapsulation layer 60 and the protective layer 90.

Further referring to FIG. 3, the substrate layer 20 formed by deposition is disposed on a side of the array layer 40 away from the light-emitting functional layer 50, and a thickness of the substrate layer 20 is between 5 μm and 10 μm, preferably 6 μm. In addition, an optical adhesive layer 30 may be disposed between the substrate layer 20 and the array layer 40, and a thickness of the optical adhesive layer 30 is between 5 μm and 20 μm, preferably between 5 μm and 15 μm. Further, the thickness of the optical adhesive layer 30 may be 10 μm. Compared with the OLED display panel 100 in the prior art, the OLED display panel 200 according to the embodiment of the present disclosure adopts the substrate layer 20 and the optical adhesive layer 30, instead of the backplane and the pressure-sensitive adhesive layer in the prior art, and the thickness of the substrate layer 20 and the optical adhesive layer 30 is further designed in the OLED display panel of the present disclosure, which effectively reduces a thickness of the OLED display panel 200, thereby facilitating the thinning and lightening of the display panel.

Please referring to FIG. 3, the touch layer 70 is formed on a side of the encapsulation layer 60 away from the light-emitting functional layer 50. The touch layer 70 according to the embodiment of the present disclosure may be formed by a direct on-cell touch (DOT) technology integrated with encapsulation and touch. Compared with the OLED display panel 100 in the prior art, the OLED display panel 200 does not require a separate touch panel, but forms components that realize touch function on a side of the encapsulation layer 60 in a layered structure through the technology of encapsulation and touch integration. Therefore, a thickness of the touch layer 70 of the OLED display panel 200 according to the present disclosure can be greatly reduced compared to the prior art. In this embodiment, the thickness of the touch layer 70 may be between 3 µm and 15 µm, preferably, between 4 µm and 10 µm. Further, the thickness of the touch layer 70 may be 5 µm.

The filter layer 80 is formed on a side of the touch layer 70 away from the encapsulation layer 60. Wherein, the filter layer 80 comprises a black matrix layer and a color filter layer. Wherein, a thickness of the filter layer 80 is between 5 µm and 15 µm, preferably, 10 µm. Compared with the polarizer (POL) used in the prior art, the filter layer 80 of this embodiment is a polarizer-less (POL-less) structure. Since the polarizer has high price, brittle film material, large thickness, and low transmittance, it is difficult for the polarizer to meet products' demands for low power consumption, thin and light flexible display. However, the black matrix layer and the color filter layer have advantages of high transmittance and small film thickness, so using the filter layer 80 to replace the polarizer and the optical adhesive layers on both sides of the polarizer can increase a light extraction rate of the OLED display panel and further reduce the thickness of the OLED display panel.

Further referring to FIG. 3, the protective layer 90 is deposited on a side of the filter layer 80 away from the touch layer 70, and a thickness of the protective layer 90 may preferably be 10 µm.

Figure 4:
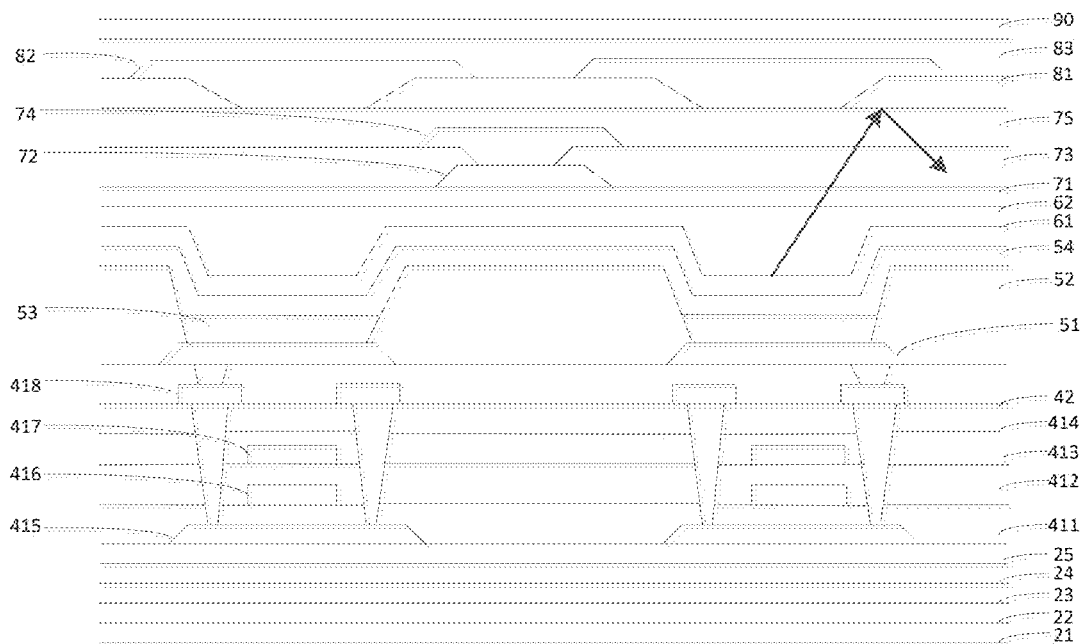
FIG. 4 shows a schematic cross-sectional diagram of the OLED display panel according to an embodiment of the present disclosure.

FIG. 4 shows a schematic cross-sectional diagram of an OLED display panel according to an embodiment of the present disclosure.

Referring to FIG. 4 and further in conjunction with FIG. 3, the OLED display panel 200 of the present disclosure comprises the substrate layer 20, the array layer 40, the light-emitting functional layer 50, the encapsulation layer 60, the touch layer 70, the filter layer 80, and the protective layer 90 stacked in sequence.

The OLED display panel 200 generally uses polyimide (PI) as a flexible substrate. As shown in FIG. 4, the substrate layer 20 comprises a first substrate layer 21 and a first barrier layer 22 formed on a side of the first substrate layer 21 close to the array layer 40. In this embodiment, the first substrate layer 21 may comprise polyimide. The first barrier layer 22 is made of silicon oxide or silicon nitride, which has a high transmittance. Wherein, the first substrate layer 21 and the first barrier layer 22 may be formed by chemical vapor deposition or the like.

In some embodiments, the substrate layer 20 may further comprise: a second substrate layer 23 formed on a side of the first barrier layer 22 away from the first substrate layer 21; and a second barrier layer 24 formed on a side of the second substrate layer 23 away from the first barrier layer 22. Wherein, the second substrate layer 23 and the first substrate layer 21 may be made of a same material, and the second barrier layer 24 and the first barrier layer 22 may be made of a same material. In addition, the first barrier layer 22 and the second barrier layer 24 may be formed by a same process, and the first substrate layer 21 and the second substrate layer 23 maybe formed by a same process.

In addition, the substrate layer 20 may further comprise a buffer layer 25 formed on a side of the second barrier layer 24 away from the second substrate layer 23. Wherein, the buffer layer 25 may be formed by technique such as chemical vapor deposition, and may be a silicon oxide film, a silicon nitride film, or a composite film formed by alternately stacking silicon oxide films and silicon nitride films, in order to further block intrusion of external oxygen and water.

Compared with the OLED display panel in the prior art, the OLED display panel 200 according to the embodiment of the present disclosure uses the substrate layer 20 to replace the backplane and the pressure-sensitive adhesive layer in the prior art, which effectively reduces the thickness of the OLED display panel and is conducive to the lightening and thinning of the display panel.

Further refer to FIG. 1 and FIG. 4, the array layer 40 comprises a thin film transistor layer 41 formed on a side of the substrate layer 20 and a planarization layer 42 formed on a side of the thin film transistor layer 41 away from the substrate layer.

The thin film transistor layer 41 comprises a first insulating layer 411, a second insulating layer 412, and a first interlayer insulating layer 413 stacked in sequence. Wherein, the first insulating layer 411, the second insulating layer 412, and the first interlayer insulating layer 413 are all formed of inorganic materials.

The thin film transistor layer 41 further comprises an active layer 415 formed between the substrate layer 20 and the first insulating layer 411, a first metal layer 416 formed between the first insulating layer 411 and the second insulating layer 412, and a second metal layer 417 formed between the second insulating layer 412 and the first interlayer insulating layer 413. Wherein, the active layer 415 comprises channel regions, and a source region and a drain region located at both ends of each of the channel regions. The active layer 415 is covered by the first insulating layer 411, the first metal layer 416 is formed on the first insulating layer 411 at a position corresponding to the active layer 415, and the first metal layer 416 is covered by the second insulating layer 412. In addition, the second metal layer 417 is disposed on the second insulating layer 412 at a position corresponding to the first metal layer 416, and the second metal layer 417 is covered by the first interlayer insulating layer 413. Wherein, the first metal layer 416 and the second metal layer 417 may comprise first gate electrodes and second gate electrodes, respectively. In some embodiments, a second interlayer insulating layer 414 may be further disposed on the first interlayer insulating layer 413. Wherein, the second interlayer insulating layer 414 is also formed of inorganic materials.

A source-drain layer 418 is formed over the second interlayer insulating layer 414. As shown in FIG. 4, each source electrode and each drain electrode in the source-drain layer 418 are connected to the source region and the drain region of the active layer 415 below through vias formed in the first insulating layer 411, the second insulating layer 412, the first interlayer insulating layer 413, and the second interlayer insulating layer 414.

The planarization layer 42 is formed above the source-drain layer 418 and covers the source-drain layer 418. The planarization layer 42 is configured to planarize film layers above the thin film transistor layer 41 and other areas of the film layer, so as to facilitate subsequent preparation of pixel electrodes and OLED devices on a flat film surface.

The light-emitting functional layer 50 comprises pixel electrodes 51 formed on a side of the array layer 40 away from the substrate layer 20 and a pixel defining layer 52 formed on a side of the pixel electrodes 51 away from the array layer 40. The pixel defining layer 52 has opening areas exposing the pixel electrodes 51. The light-emitting functional layer 50 further comprises a light-emitting layer 53 formed in the opening areas and located on the pixel electrodes 51 and a cathode electrode layer 54 covering the light-emitting layer and the pixel defining layer 52. Wherein, each of the pixel electrodes 51 is connected to the source electrode or the drain electrode in the source-drain layer 418 through an opening formed in the planarization layer 42. In some embodiments, the pixel defining layer 52 further comprises photo spacers (PS).

In this embodiment, the encapsulation layer 60 may be a superimposed layer of an inorganic encapsulation layer 61 and an organic encapsulation layer 62. Wherein, the inorganic encapsulation layer 61 is formed between the organic encapsulation layer 62 and the light-emitting functional layer 50. In addition, the organic encapsulation layer 62 has a planarization function.

As shown in FIG. 4, the touch layer 70 is formed above the encapsulation layer 60. The touch layer 70 may be a self-capacitive single-layer metal layer or a mutual-capacitive double-layer metal layer. In some embodiments, the touch layer 70 may be mutual-capacitive, which may comprise: a first touch insulating layer 71, a first touch metal layer 72, a second touch insulating layer 73, and a second touch metal layer 74. The first touch insulating layer 71 is formed on a side of the encapsulation layer 60 away from the light-emitting functional layer 50; the first touch metal layer 72 is formed on a side of the first touch insulating layer 71 away from the encapsulation layer 60, and has a metal mesh structure; the second touch insulating layer 73 is formed on a side of the first touch metal layer 72 away from the first touch insulating layer 71, and has a contact hole formed at a position corresponding to the first touch metal layer 72; and the second touch metal layer 74 is formed on a side of the second touch insulating layer 73 away from the first touch metal layer 72, wherein the second touch metal layer 74 is a metal mesh structure and is filled in the contact hole to contact the first touch metal layer 72.

Specifically, after packaging is completed, a touch material is deposited on the planarized encapsulation layer 60 to form the touch layer 70. The DOT technique can be used to form a touch metal layer on the encapsulation layer 60. The first touch insulating layer 71 is formed on the encapsulation layer 60, and the first touch metal layer 72 is formed on the first touch insulating layer 71. After that, the second touch insulating layer 73 is formed on the first touch insulating layer 71 and the first touch metal layer 72, and the contact hole is formed in the second touch insulating layer 73 through a photolithography process. Finally, the second touch metal layer 74 is formed, and metal material is also filled in the contact hole, so that the first touch metal layer 72 and the second touch metal layer 74 are in contact through the contact hole. Therefore, compared with the OLED display panel in the prior art, the OLED display panel of the present disclosure does not need a separate touch panel, but uses the DOT technology to form a component that realizes the touch function in a layered structure on a side of the encapsulation layer 60. Therefore, the thickness of the touch layer 70 of the OLED display panel 200 according to the present disclosure can be greatly reduced compared to the prior art.

In addition, the touch layer 70 may further comprise an organic material layer 75 formed above the second touch metal layer 74, which covers underlying structure and provides a planarized surface to facilitate the formation of subsequent structures.

In other embodiments, the touch layer 70 may be self-capacitive, which may comprise the first touch insulating layer and the first touch metal layer. Firstly, the first touch insulating layer is formed on the encapsulation layer 60; and then, the first touch metal layer is formed on the first touch insulating layer. Wherein, the first touch metal layer may adopt a metal mesh structure.

The filter layer 80 comprises a black matrix layer 81 and a color filter layer 82. The black matrix layer 81 is disposed corresponding to positions of the first touch metal layer 72 and the second touch metal layer 74, and a projection of the black matrix layer 81 on a plane of the substrate layer and projections of the first touch metal layer 72 and the second touch metal layer 74 on the plane of the substrate layer are overlapped so as to block the first touch metal layer 72 and the second touch metal layer 74 below. A plurality of opening regions are provided in the black matrix layer 81, and the color filter layer 82 is filled in the opening regions to receive light excited from the light-emitting functional layer 50.

Specifically, firstly, the photolithography process is used to coat, expose, and develop a low-temperature black matrix material on the touch layer 70; and then, grooves are formed in the black matrix material to form a black matrix layer. A low-temperature filter material is coated, exposed, and developed from the inside of the grooves through a mask evaporation method or an inkjet printing method to form the color filter layer. Compared with the prior art, the filter layer of the present disclosure replaces the polarizer and the optical adhesive layers on both sides of the polarizer, which can increase the light extraction rate of the OLED display panel and can further reduce the thickness of the OLED display panel.

In this embodiment, an insulating cover layer 83 may also be disposed above the black matrix layer 81 and the color filter layer 82. In addition, the protective layer 90 is also coated and formed on the filter layer 80 to further protect materials below.

The OLED display panel according to the exemplary embodiment of the present disclosure replaces the glass cover plate, the polarizer, the touch panel, and the backplane in the prior art, and forms the protective layer 90, the filter layer 80, the touch layer 70, and the substrate layer 20 directly through deposition, coating, etc. A total thickness of the OLED display panel 200 according to the embodiment of the present disclosure is greatly reduced compared to the prior art, which effectively improves the lightness and thinness of the display panel.

In addition, the OLED display panel 200 according to the embodiment of the present disclosure further omits the optical adhesive layers for bonding the glass cover plate, the polarizer, and the touch panel in comparison with the prior art. Specifically, in the OLED display panel 200 according to the embodiment of the present disclosure, the filter layer 80 is formed directly on the touch layer 70, and the protective layer 90 is formed directly on the filter layer. Therefore, there is no adhesive layer between the touch layer 70 and the filter layer 80 and between the filter layer 80 and the protective layer 90, thereby further reducing the thickness of the display panel. However, the present disclosure is not limited to this. In some embodiments, there is no adhesive layer between the touch layer 70 and the protective layer 90. In some embodiments, there is no adhesive layer between the array layer 40 and the protective layer 90.

Figure 5:
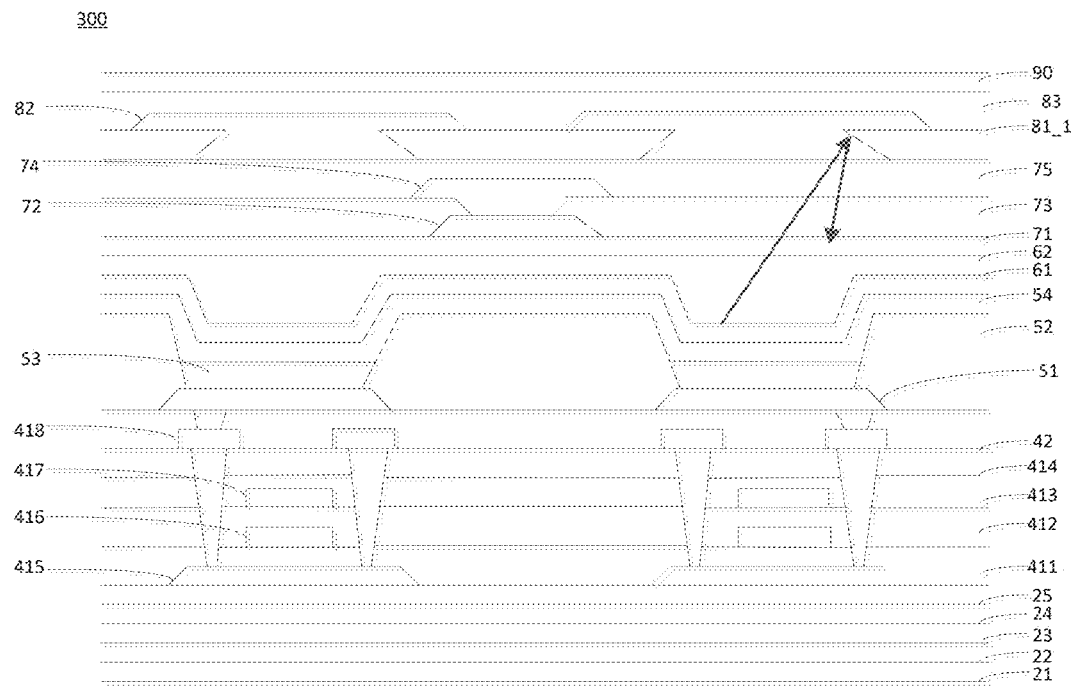
FIG. 5 shows a schematic cross-sectional diagram of an OLED display panel according to another embodiment of the present disclosure.

FIG. 5 shows a schematic cross-sectional diagram of an OLED display panel according to another embodiment of the present disclosure.

Referring to FIG. 4, the OLED display panel 200 of the present disclosure is provided with the color filter layer 82 and the black matrix layer 81 instead of the polarizer to reduce the thickness and increase the light transmittance. However, since a cross section of the black matrix layer 81 with the opening regions is generally rectangular or trapezoidal with narrow top and wide bottom, FIG. 4 exemplarily shows a trapezoidal cross section. As shown by arrows in FIG. 4, light emitted from the light-emitting functional layer 50 has a relatively large divergence angle. Except for part of the light that smoothly enters the color filter layer 82, part of the light with a larger divergence angle enters the black matrix layer 81 and is partially reflected by the black matrix layer 81. Since the black matrix layer has a cross section of narrow top and wide bottom, the light will enter a lower surface of the black matrix layer, and be reflected by the lower surface to form an even larger divergence angle, and then the reflected light will be scattered to other structures to form stray light and the light extraction rate is reduced. Therefore, in this embodiment, the shape of the black matrix layer is improved to further utilize the reflected light to improve the light extraction rate.

As shown in FIG. 5, an OLED display panel 300 of the present disclosure comprises the substrate layer 20, the array layer 40, the light-emitting functional layer 50, the encapsulation layer 60, the touch layer 70, a filter layer 80_1 and the protective layer 90 stacked in sequence. In FIG. 5, except for the filter layer, other components are basically the same as those described with reference to FIG. 4, and therefore, repeated descriptions are omitted here. Merely the filter layer will be described in detail below.

Referring to FIG. 4 and FIG. 2, the filter layer is disposed between the touch layer 70 and the protective layer 90, and comprises a black matrix layer 81_1 and the color filter layer 82. In this embodiment, the insulating cover layer 83 may further be disposed above the black matrix layer 81_1 and the color filter layer 82.

The black matrix layer 81_1 is disposed corresponding to the positions of the first touch metal layer 72 and the second touch metal layer 74, and a projection of the black matrix layer 81_1 on the plane of the substrate layer and the projection of the first touch metal layer 72 and the second touch metal layer 74 on the plane of the substrate layer are overlapped so as to block the first touch metal layer 72 and the second touch metal layer 74 below. A plurality of opening regions are provided in the black matrix layer 81_1, and the color filter layer 82 is filled in the opening regions to receive the light excited from the light-emitting functional layer 50. Specifically, firstly, the photolithography process is used to coat, expose, and develop the low-temperature black matrix material on the touch layer 70; and then, grooves are formed in the black matrix material to form the black matrix layer, and the low-temperature filter material is coated, exposed, and developed from the inside of the grooves through the mask evaporation method or the inkjet printing method to form the color filter layer.

In addition, in order to further improve utilization of the reflected light, a cross section of any one of the opening regions of the black matrix layer 81_1 shown in FIG. 5 has a shape of wide top and narrow bottom. Specifically, the cross section has an inverted trapezoidal shape with a narrow bottom and a wide top. Specifically, an area of a lower surface of the black matrix layer 81_1 in contact with the touch layer 70 is smaller than an area of an upper surface of the black matrix layer 81_1 in contact with the protective layer 90, and a projection of the lower surface of the black matrix layer 81_1 on a plane of the touch layer 70 falls within a projection of the upper surface of the black matrix layer 81_1 on the plane of the touch layer 70. In some embodiments, an angle formed by a side surface connecting the upper surface and the lower surface and a surface where the touch layer 70 is located is an acute angle.

As shown by arrows in FIG. 5, the light emitted from the light-emitting functional layer 50 has a relatively large divergence angle. Except for part of the light that smoothly enters the color filter layer 82, part of the light with a larger divergence angle enters the black matrix layer 81_1, and is partially reflected by the black matrix layer 81_1. Since the black matrix layer 81_1 has the cross section of narrow bottom and wide top, the lower surface in contact with the touch layer 70 has a small area. Therefore, only a small part of the light will be incident on the lower surface of the black matrix layer 81_1 and be reflected by the lower surface, while most of the divergent light will be incident on a side surface of the black matrix layer 81_1 and reflected by the side surface. Since the side surface is at an acute angle with respect to the plane of the touch layer 70, as shown in FIG. 5, the light reflected by the side surface will converge toward the light-emitting functional layer 50 in a reverse direction, and will be directed to the light-emitting functional layer 50 again and exit toward the color filter layer 82 after being reflected by the light-emitting functional layer 50. Therefore, by setting the lower surface of the black matrix layer 81_1 to be small, the side surface has an acute angle with respect to the plane of the touch layer 70, so that the divergent light can be reflected and converged, and the light extraction rate of the display panel can be improved.

Figure 9:
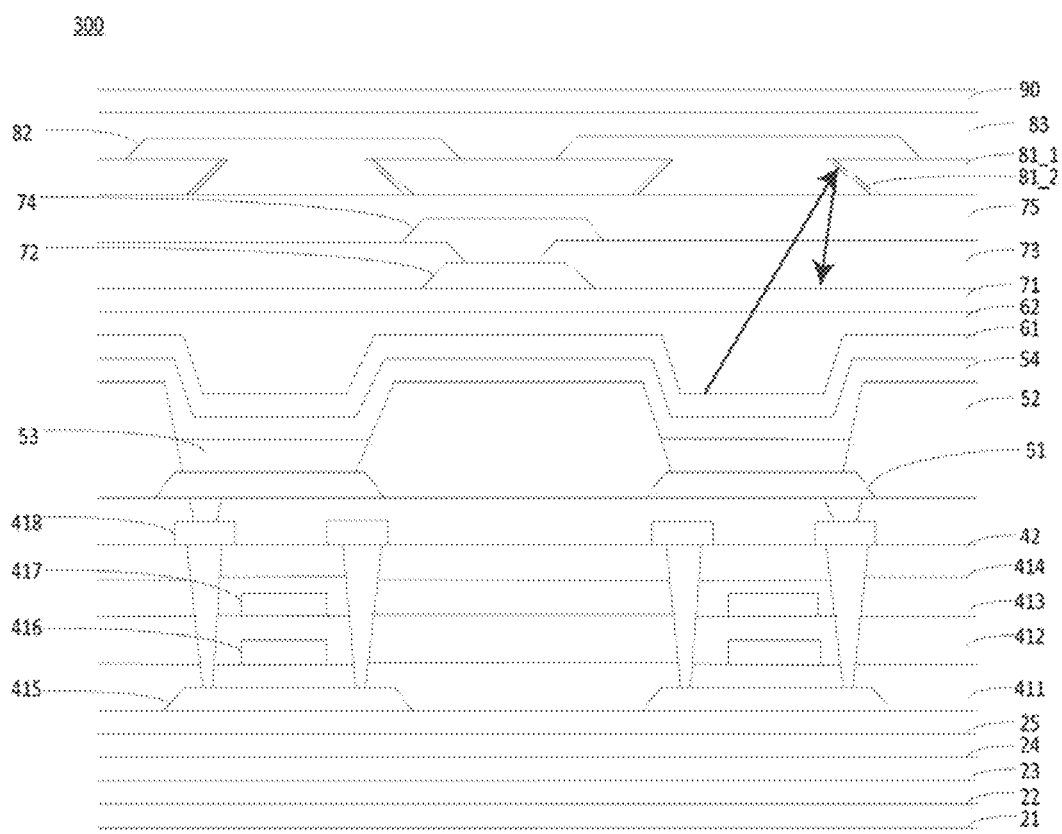
FIG. 9 shows a schematic cross-sectional diagram of an OLED display panel according to an embodiment of the present disclosure.

In some embodiments, as shown in FIG. 9, in order to improve light utilization ratio, a reflective film 81_2 may be formed on the side surface of the black matrix layer 81_1. Specifically, black matrix currently used in the POL-less structure is a black polyimide film, which is made by adding black pigments to polyimide resin, and the black matrix has a good light-shielding property, thermal conductivity, and the like. By introducing inorganic component graphene into a black matrix base, conductivity of black matrix material can be improved. Using this characteristic, a black matrix material with conductive characteristics can be obtained. The conductive black matrix material is used as a cathode, and Ag or other metals are used as an anode. Using a principle of electroplating, a metal film can be electroplated on a surface of the black matrix as a metal reflective film. In addition, a change of reflectivity ratio of Ag films with different thicknesses is measured by using a Cary 5000 ultraviolet-visible-near infrared photometer. In a case where a thickness of an Ag film is less than 130 nm, as the thickness of the Ag film increases, a reflectivity ratio of Ag also sharply increases. However, when the thickness of the Ag film exceeds 130 nm, as the thickness of the Ag film continues to increase, and the reflectivity ratio decreases instead. Therefore, in the embodiment of the present disclosure, the thickness of the Ag film is preferably less than 130 nm.

The OLED display panel according to the embodiment of the present disclosure replaces the backplane, the touch panel, the polarizer, the glass cover plate, and other structures of the OLED display panel in the prior art, and forms the substrate layer, the integrated touch layer, and the filter layer without polarizer by coating, deposition, etc. Compared with the prior art, the use of the adhesive layers is reduced. Therefore, the thickness of the OLED display panel is greatly reduced, and the light transmittance is improved, which is beneficial to the lightness and thinness of the OLED display panel and improves display quality. In addition, according to the OLED display panel of the embodiment of the present disclosure, the lower surface of the black matrix layer is set to be small, so that the side surface has the acute angle with respect to the plane of the touch layer, so that the divergent light can be reflected and converged and the light extraction rate of the display panel is improved.

Figure 6:
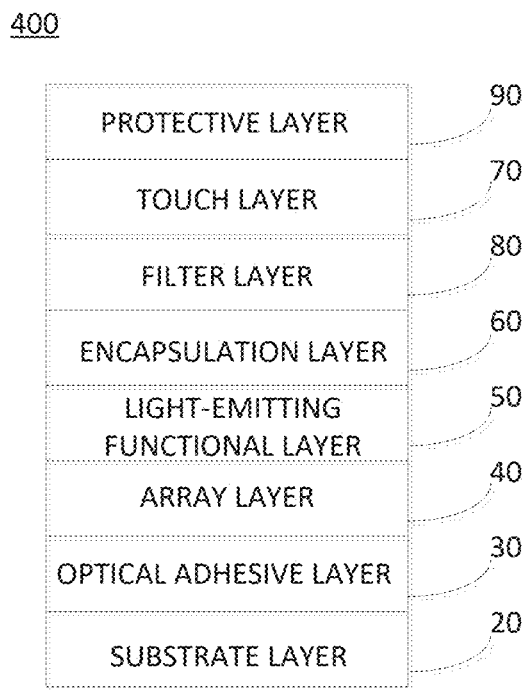
FIG. 6 shows a schematic cross-sectional diagram of an OLED display panel according to yet another embodiment of the present disclosure.

FIG. 6 shows a schematic cross-sectional diagram of an OLED display panel according to yet another embodiment of the present disclosure.

As shown in FIG. 6, similar to OLED display panel 200 in the prior art shown in FIG. 3, an OLED display panel 400 according to the embodiment of the present disclosure also comprises the substrate layer 20, the array layer 40, the light-emitting functional layer 50, and the encapsulation layer 60 stacked in sequence. Compared with the OLED display panel 200 in the prior art shown in FIG. 3, the OLED display panel 400 shown in FIG. 6 only exchanges positions of the touch layer 70 and the filter layer 80. That is, the OLED display panel 400 further comprises the filter layer 80, the touch layer 70, and the protective layer 90 sequentially stacked on the encapsulation layer 60, and there is no adhesive layer between the touch layer 70 and the filter layer 80, and between the touch layer 70 and the protective layer 90. Furthermore, there is no adhesive layer between the encapsulation layer 60 and the protective layer 90.

Figure 7:
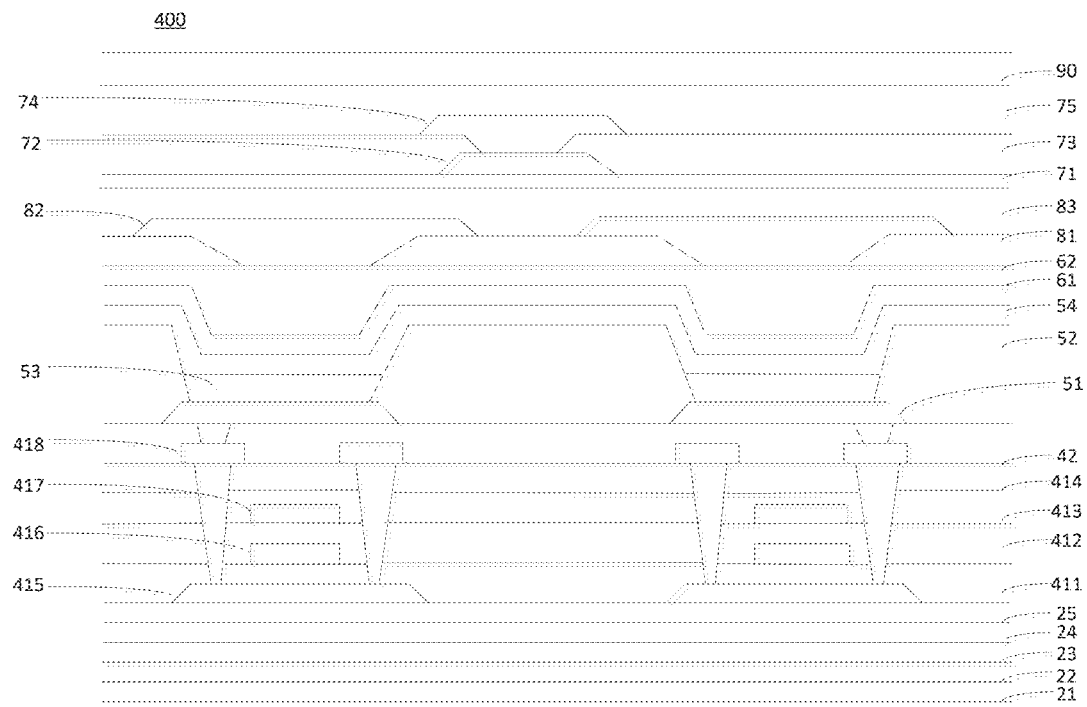
FIG. 7 shows a schematic cross-sectional diagram of the OLED display panel according to an embodiment of the present disclosure.

FIG. 7 shows a schematic cross-sectional diagram of an OLED display panel according to an embodiment of the present disclosure.

Referring to FIG. 7 and further in conjunction with FIG. 6, the OLED display panel 400 of the present disclosure comprises the substrate layer 20, the array layer 40, the light-emitting functional layer 50, the encapsulation layer 60, the filter layer 80, the touch layer 70, and the protective layer 90 stacked in sequence. Compared with the embodiment shown in FIG. 5, merely the positions of the filter layer 80 and the touch layer 70 are exchanged. Therefore, repeated description is omitted here.

As shown in FIG. 7, the filter layer 80 is formed above the encapsulation layer 60. The filter layer 80 comprises the black matrix layer 81 and the color filter layer 82. Specifically, firstly, the photolithography process is used to coat, expose, and develop the low-temperature black matrix material on the encapsulation layer 60; and then, grooves are formed in the black matrix material to form the black matrix layer, and the low-temperature filter material is coated, exposed, and developed from the inside of the grooves through the mask evaporation method or the inkjet printing method to form the color filter layer.

The touch layer 70 is formed over the filter layer 80. Specifically, the touch material is deposited on the planarized encapsulation layer 60 to form the touch layer 70. The touch material is deposited on the filter layer 80 by the DOT technique to form the touch layer 70.

The OLED display panel according to the exemplary embodiment of the present disclosure replaces the glass cover plate, the polarizer, the touch panel, and the backplane in the prior art, and forms the protective layer 90, the filter layer 80, the touch layer 70, and the substrate layer 20 directly through deposition, coating, etc. In addition, the optical adhesive layers for bonding the glass cover plate, the polarizer, and the touch panel are also omitted. The total thickness of the OLED display panel 400 according to the embodiment of the present disclosure is greatly reduced compared to the prior art, which effectively improves the lightness and thinness of the display panel.

Figure 8:
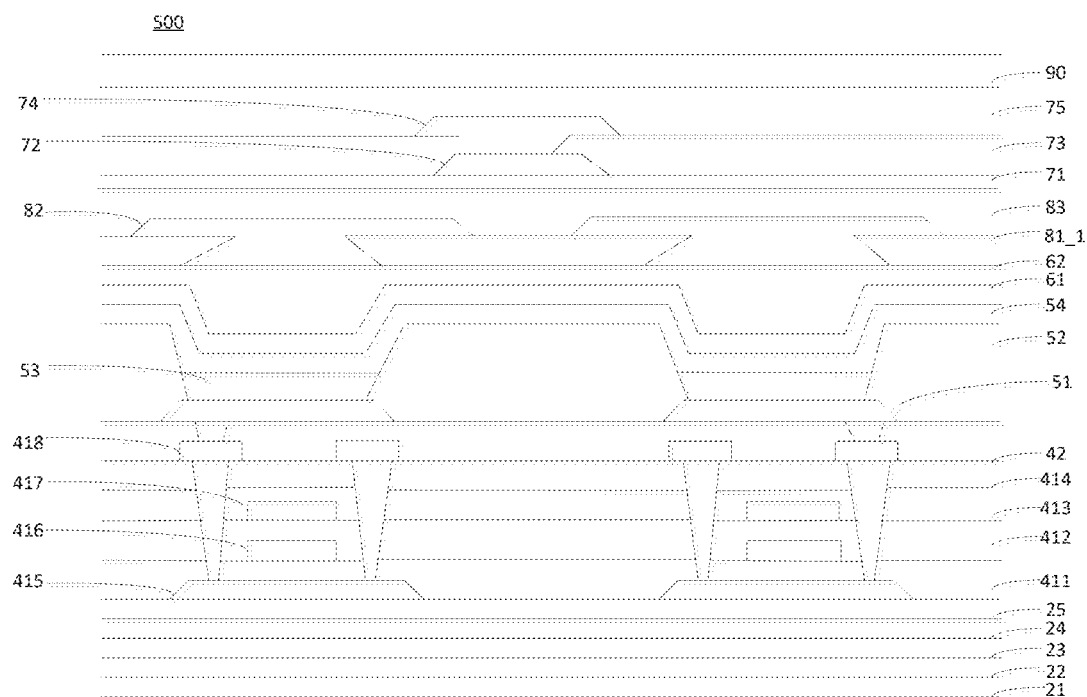
FIG. 8 shows a schematic cross-sectional diagram of an OLED display panel according to still another embodiment of the present disclosure.

FIG. 8 shows a schematic cross-sectional diagram of an OLED display panel according to still another embodiment of the present disclosure.

Compared with the OLED display panel 400 shown in FIG. 7, an OLED display panel 500 of FIG. 8 has basically same components as those described with reference to FIG. 7 except for the filter layer, and therefore, repeated descriptions are omitted here. Merely the filter layer will be described below.

Referring to FIGS. 8 and 6, the filter layer is disposed under the touch layer, and comprises the black matrix layer 81_1 and the color filter layer 82.

As shown in FIG. 8, in order to further improve utilization ratio of the reflected light, a cross section of the black matrix layer 81_1 has the shape of narrow bottom and wide top. Specifically, the area of the lower surface of the black matrix layer 81_1 in contact with the encapsulation layer 60 is smaller than the area of the upper surface of the black matrix layer 81_1 in contact with the touch layer 70, and a projection of the lower surface of the black matrix layer 81_1 on a plane of the encapsulation layer 60 falls within a projection of the upper surface of the black matrix layer 81_1 on the plane of the encapsulation layer 60. In some embodiments, the angle formed by the side surface connecting the upper surface and the lower surface and the surface where the encapsulation layer 60 is located is an acute angle.

In some embodiments, in order to improve light utilization ratio, a reflective film may be formed on the side surface of the black matrix layer 81_1.

The OLED display panel according to the embodiment of the present disclosure replaces the backplane, the touch panel, the polarizer, the glass cover plate, and other structures of the OLED display panel in the prior art, and forms the substrate layer, the integrated touch layer, and the filter layer without polarizer by coating, deposition, etc. Compared with the prior art, the use of the adhesive layers is reduced. Therefore, the thickness of the OLED display panel is greatly reduced, and the light transmittance is improved, which is beneficial to the lightness and thinness of the OLED display panel and improves the display quality. In addition, according to the OLED display panel of the embodiment of the present disclosure, the lower surface of the black matrix layer is set to be small, so that the side surface has an acute angle with respect to the plane of the touch layer, so that the divergent light can be reflected and converged and the light extraction rate of the display panel is improved.

The embodiments of the disclosure are described in detail above, and specific examples are used in this article to illustrate the principles and implementation of the disclosure. The descriptions of the above examples are only used to help understand the methods and core ideas of the disclosure; at the same time, for persons of ordinary skill in the art, based on the ideas of the present disclosure, will have changes in the specific implementation and the scope of disclosure. In summary, the content of this specification should not be construed as limiting the disclosure.

What is claimed is:

1. An organic light-emitting diode (OLED) display panel, wherein the OLED display panel comprises:
a substrate layer;
an array layer formed on a side of the substrate layer;
a light-emitting functional layer formed on a side of the array layer away from the substrate layer;
an encapsulation layer formed on a side of the light-emitting functional layer away from the array layer; and
a protective layer formed on a side of the encapsulation layer away from the light-emitting functional layer, wherein the protective layer is formed as an outermost side of the display panel,
wherein a touch layer and a filter layer are further disposed between the encapsulation layer and the protective layer, the filter layer comprises a black matrix layer and a color filter layer, and there is no adhesive layer between any two adjacent layers among the encapsulation layer, the touch layer, the filter layer, and the protective layer, wherein the black matrix layer has a top surface facing the protective layer, a bottom surface contacting the touch layer, and a side surface connecting the top surface with the bottom surface, and an acute angle is formed between the side surface of the black matrix layer and a plane of the touch layer, and wherein a metal reflective film is formed on the side surface of the black matrix layer;

wherein the touch layer comprises the following layers formed by deposition:

a first touch insulating layer formed on the side of the encapsulation layer away from the light-emitting functional layer, a first touch metal layer formed on a side of the first touch insulating layer away from the encapsulation layer, a second touch insulating layer formed on a side of the first touch metal layer away from the first touch insulating layer, wherein a contact hole is formed at a position on the second touch insulating layer corresponding to the first touch metal layer, and a second touch metal layer formed on a side of the second touch insulating layer away from the first touch metal layer, wherein the contact hole is filled with the second touch metal layer, so that the second touch metal layer contacts the first touch metal layer;

wherein the filter layer is disposed on a side of the touch layer away from the substrate layer, the black matrix layer is disposed corresponding to positions of the first touch metal layer and the second touch metal layer, a projection of the black matrix layer on a plane of the substrate layer is overlapped with projections of the first touch metal layer and the second touch metal layer on the plane of the substrate layer, a plurality of opening regions are disposed in the black matrix layer, and the color filter layer is filled in each of the plurality of opening regions by coating, exposing, and developing a low-temperature filter material from the inside of the opening regions, so as to receive light excited from the light-emitting functional layer.

2. The OLED display panel of claim 1, wherein a cross section of each of the opening regions is trapezoidal.

3. The OLED display panel of claim 1, wherein a thickness of the metal reflective film is less than 130 nm.

4. The OLED display panel of claim 3, wherein the substrate layer comprises:

a first substrate layer; and a first barrier layer formed on a side of the first substrate layer close to the array layer, wherein the first substrate layer and the first barrier layer are formed by chemical vapor deposition.

5. The OLED display panel of claim 4, wherein the substrate layer further comprises:

a second substrate layer formed on a side of the first barrier layer away from the first substrate layer; and a second barrier layer formed on a side of the second substrate layer away from the first barrier layer, wherein the second substrate layer and the second barrier layer are formed by chemical vapor deposition.

6. The OLED display panel of claim 5, wherein the protective layer is formed on the filter layer by deposition.

7. An organic light-emitting diode (OLED) display panel, wherein the OLED display panel comprises:

a substrate layer;

an array layer formed on a side of the substrate layer;

a light-emitting functional layer formed on a side of the array layer away from the substrate layer;

an encapsulation layer formed on a side of the light-emitting functional layer away from the array layer; and a protective layer formed on a side of the encapsulation layer away from the light-emitting functional layer, wherein the protective layer is formed as an outermost side of the display panel, wherein a touch layer and a filter layer are further disposed between the encapsulation layer and the protective layer, and the filter layer is disposed on a side of the touch layer close to the substrate, wherein the filter layer comprises a black matrix layer and a color filter layer, wherein there is no adhesive layer between any two adjacent layers among the encapsulation layer, the touch layer, the filter layer, and the protective layer, wherein the black matrix layer has a top surface facing the touch layer, a bottom surface contacting the encapsulation layer, and a side surface connecting the top surface with the bottom surface, and an acute angle is formed between the side surface of the black matrix layer and a plane of the encapsulation layer, and wherein a metal reflective film is formed on the side surface of the black matrix layer;

wherein the touch layer comprises the following layers formed by deposition:

a first touch insulating layer formed on a side of the filter layer away from the light-emitting functional layer, a first touch metal layer formed on a side of the first touch insulating layer away from the encapsulation layer, a second touch insulating layer formed on a side of the first touch metal layer away from the first touch insulating layer, wherein a contact hole is formed at a position on the second touch insulating layer corresponding to the first touch metal layer, and a second touch metal layer formed on a side of the second touch insulating layer away from the first touch metal layer, wherein the contact hole is filled with the second touch metal layer, so that the second touch metal layer contacts the first touch metal layer;

wherein the black matrix layer is disposed corresponding to positions of the first touch metal layer and the second touch metal layer, a projection of the black matrix layer on a plane of the substrate layer is overlapped with projections of the first touch metal layer and the second touch metal layer on the plane of the substrate layer, wherein a plurality of opening regions are disposed in the black matrix layer, and the color filter layer is filled in each of the plurality of opening regions by coating, exposing, and developing a low-temperature filter material from the inside of the opening regions, so as to receive light excited from the light-emitting functional layer.

8. The OLED display panel of claim 7, wherein a cross section of each of the opening regions is trapezoidal.

9. The OLED display panel of claim 7, wherein a thickness of the metal reflective film is less than 130 nm.

10. The OLED display panel of claim 9, wherein the substrate layer comprises:

a first substrate layer; and a first barrier layer formed on a side of the first substrate layer close to the array layer, wherein the first substrate layer and the first barrier layer are formed by chemical vapor deposition.

11. The OLED display panel of claim 10, wherein the substrate layer further comprises:
    a second substrate layer formed on a side of the first barrier layer away from the first substrate layer; and
    a second barrier layer formed on a side of the second substrate layer away from the first barrier layer,
    wherein the second substrate layer and the second barrier layer are formed by chemical vapor deposition.

12. The OLED display panel of claim 11, wherein the protective layer is formed on the touch layer by deposition.

* * * * *